United States Patent [19]

Masaki

[11] Patent Number: 4,710,698
[45] Date of Patent: Dec. 1, 1987

[54] PHASE-CONTROLLED AUTOMATIC SWITCHING CIRCUIT

[75] Inventor: Kazumi Masaki, Osaka, Japan

[73] Assignee: Ken Hayashibara, Okayama, Japan

[21] Appl. No.: 869,457

[22] Filed: May 28, 1986

[30] Foreign Application Priority Data

Jun. 5, 1985 [JP] Japan ................... 60-122058

[51] Int. Cl.$^4$ ............................................. G05F 1/455
[52] U.S. Cl. ................................... 323/239; 323/265;
323/365; 323/370
[58] Field of Search ............... 323/239, 265, 365, 369,
323/370, 902, 905

[56] References Cited

U.S. PATENT DOCUMENTS

| | | | |
|---|---|---|---|
| 3,935,505 | 1/1976 | Spiteri | 323/905 |
| 4,008,416 | 2/1977 | Nakasone | 315/194 |
| 4,563,592 | 1/1986 | Yuhasz et al. | 323/905 |
| 4,574,230 | 3/1986 | Masaki | 323/370 |

FOREIGN PATENT DOCUMENTS

| | | |
|---|---|---|
| EPA20146809 | 7/1985 | European Pat. Off. |
| 59-189727 | 10/1984 | Japan . |
| 904246 | 8/1962 | United Kingdom . |
| 988498 | 4/1965 | United Kingdom . |
| 1152497 | 5/1969 | United Kingdom . |
| 1169817 | 11/1969 | United Kingdom . |
| 1187689 | 4/1970 | United Kingdom . |
| 1194877 | 6/1970 | United Kingdom . |
| 1545673 | 5/1979 | United Kingdom . |
| 1589664 | 5/1981 | United Kingdom . |
| A2159008 | 11/1985 | United Kingdom . |

*Primary Examiner*—Patrick R. Salce
*Assistant Examiner*—Anita M. Ault
*Attorney, Agent, or Firm*—Browdy and Neimark

[57] ABSTRACT

There is disclosed a phase-controlled switching circuit, comprising a controlled rectifier (e.g. bidirectional triode thyristor); an amplifier connected at its output terminal to the gate of the controlled rectifier; an ac Wheatstone bridge having at one of its arms a variable resistance (e.g. thermistor to CdS photoconductive cell), said ac Wheatstone bridge being connected at one branch to the input terminal of the amplifier and at its other branch between the cathode and anode of the controlled rectifier through a load; a time constant circuit connected with the variable resistance; a pair of mechanical contacts (e.g. relay) connected in parallel with the controlled rectifier and a dc source for electrifying the whole circuit.

7 Claims, 7 Drawing Figures

PHASE-CONTROLLED AUTOMATIC SWITCHING CIRCUIT

FIELD OF THE INVENTION

The present invention relates to a phase-controlled automatic switching circuit.

More particularly, the present invention relates to a phase-controlled automatic switching circuit wherein heat generation by controlled rectifier is substantially suppressed.

BACKGROUND OF THE INVENTION

Coupling of an electric motor or incandescent lamp with an ac source causes a surge current to arise which may be several- to ten-odd-fold larger than that observed when the electric motor or incandescent lamp is stationarily operated.

The present inventor disclosed in Japan Patent Kokai No. 189,727/84 that such surge current can be effectively suppressed by coupling an electric motor or incandescent lamp with an ac source through a phase-controlled automatic switching circuit, wherein an ac Wheatstone bridge having at one of its arms a variable resistance, a time constant circuit, and a controlled rectifier are all arranged in a manner that the phase of initial triggering signal is retarded to couple a load with an ac source at a relatively small phase angle; as well as disclosing that this extremely prolongs the life of an incandescent lamp.

For example, coupling of a 100 watt incandescent lamp with ac 100 volts using such switching circuit, however, has the disadvantages that the controlled rectifier, connected in series with the incandescent lamp, must be subjected to forced cooling using radiator or blower to prevent the destruction of the controlled rectifier by heat because its power consumption reaches up to 10 watts; that such forced cooling enlarges the size of the switching circuit to an unnecessary extent when a blower is used; and still that precaution may be required to reduce the noise from the blower.

SUMMARY OF THE INVENTION

In view of the foregoing, it is one object of the present invention to provide a phase-controlled switching circuit which scarcely generates heat during operation.

It is a further object of the present invention to provide a phase-controlled switching circuit which is free of motion noise, and high in durability.

These and other objects as may become apparent hereinafter have been attained by the circuit comprising a controlled rectifier; an amplifier connected at its output terminal with the gate of the controlled rectifier; an ac Wheatstone bridge having at one of its arms a variable resistance, said ac Wheatstone bridge being connected at one branch with the input terminal of the amplifier and at its other branch between the cathode and anode of the controlled rectifier through a load; a time constant circuit connected with the variable resistance; a pair of mechanical contacts connected in parallel with the controlled rectifier; and a dc source for electrifying the whole circuit.

DESCRIPTION OF THE PREFERRED EMBODIMENTS

For a better understanding of the invention as well as other objects and further features thereof, preferred embodiments of the invention will be explained with reference to the accompanying drawings in which.

Throughout the accompanying drawings, symbol C designates capacitance; R, resistance; H, transformer; L, coil; Q, photocoupler; AC, ac source; Z, load; S, switch; K, bidirectional triode thyristor; D, diode; VR, variable resistance; T, transistor; G, relay; and SCR, reverse-blocking triode thyristor.

Figure 1:
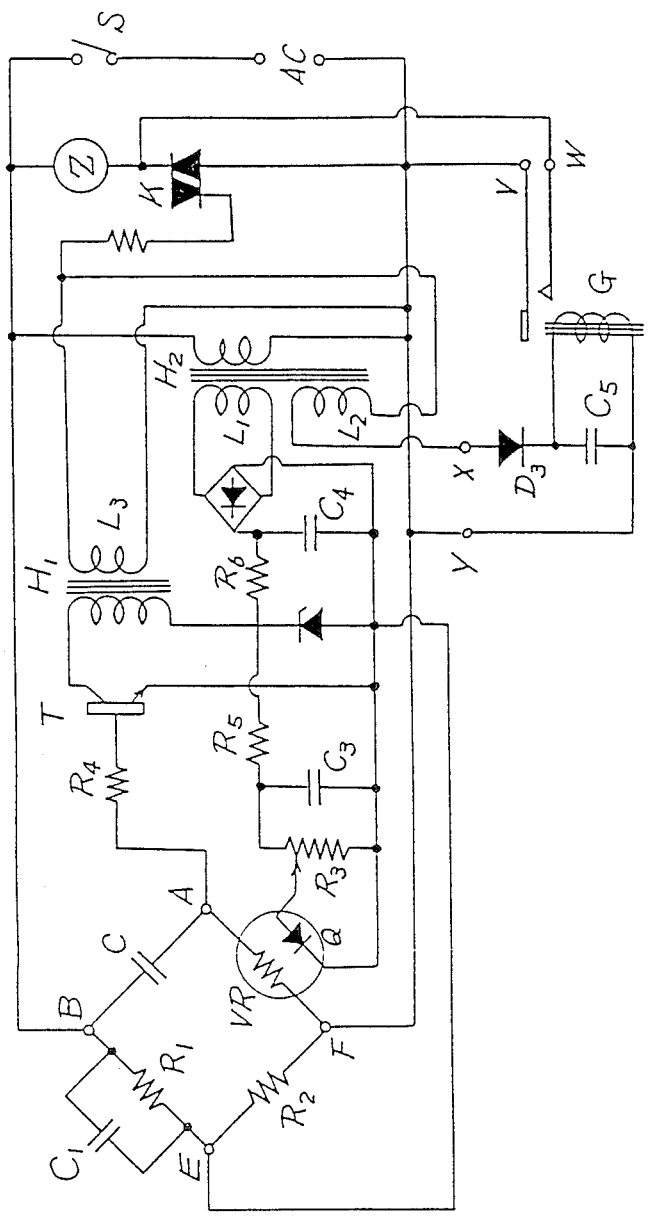
FIG. 1 is an example of the phase-controlled automatic switching circuit according to the invention.

The circuit as shown in FIG. 1 is an example of the phase-controlled automatic switching circuit according to the invention, wherein the ac Wheatstone bridge is composed of resistances $R_1$ and $R_2$, capacitances $C_1$ and C, and variable resistance VR such as CdS photoconductive cell, and wherein ac source AC is connected between terminals B and F through power switch S. The voltage of ac source AC is lowered by power transformer $H_2$, rectified and supplied to the time constant circuit consisting of resistance $R_5$ and capacitance $C_3$ to charge capacitance $C_3$. Variable resistance VR is connected with the time constant circuit while insulating with photocoupler Q.

Figure 3:
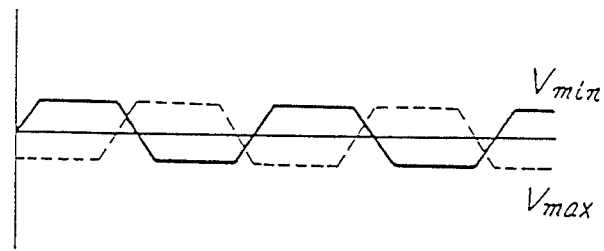
FIG. 3 is the waveforms appearing at the secondary coil of the output transformer.

In this circuit, the ac Wheatstone bridge is energized with ac voltage between terminals B and F when load Z is coupled with ac source AC by closing power switch S. The unbalanced voltage which arises between terminals A and E energizes the base of transistor T through resistance $R_4$. Since variable resistance VR is not high at this instance, the base of the transistor is applied with an ac voltage of the same phase as that at terminal B. Thus, voltage $V_{max}$ is applied to secondary coil $L_3$ of output transformer $H_1$ as indicated in FIG. 3 with the broken line, while a little current flows through bidirectional triode thyristor K because voltage $V_{max}$ is reverse in phase to the ac source.

After power switch S is closed a time as determined by the time constant circuit elapses, the light emitting diode equipped in photocoupler Q emits light to lower variable resistance VR. Thus, voltage $V_{min}$ appearing at the secondary coil of output transformer $H_1$ becomes in-phase to ac source $V_{AC}$, and bidirectional triode thyristor K begins to receive a substantial current.

Figure 4:
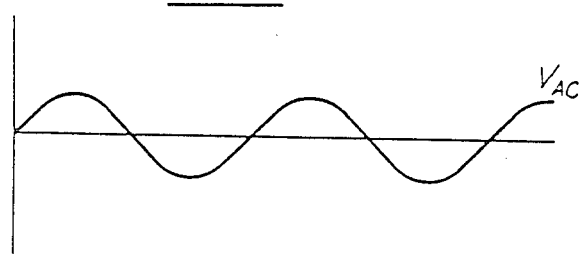
FIG. 4 is the waveform of ac source.
Figure 5:
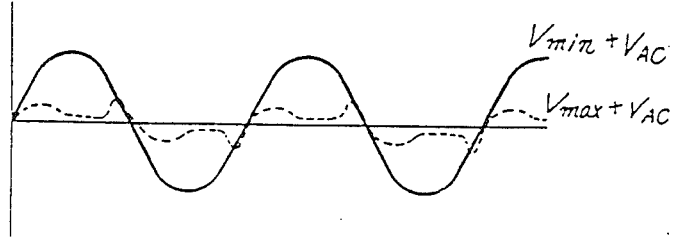
FIG. 5 is the waveform obtained by superposition of triggering signal and ac source voltage.

As indicated in FIG. 5 with the solid or broken line, the output voltage of transistor T is superposed on voltage $V_{AC}$ by connecting in series secondary coil $L_3$ of output transformer $H_1$ with secondary coil $L_2$ of output transformer $H_2$ as shown in FIG. 1. Supposing that variable resistance VR varies within the range of, for example, 1 kiloohms to 100 kiloohms, the output voltage appearing at secondary coil $L_3$ of output transformer $H_1$ instantly after power switch S is closed will be, as indicated in FIG. 3 with the broken line, phase-shifted by 90° in relation to voltage $V_{AC}$ as shown in FIG. 4. Since the ac voltage appearing at secondary coil $L_1$ of power transformer $H_2$ is rectified by diodes, smoothed by capacitance $C_4$ and resistance $R_6$, and allowed to complete the charge of capacitance $C_3$ through resistance $R_5$ within a time as determined by the time constant circuit, the light emitting diode can be programmed to emit light and to lower variable resistance VR after a lapse of 1/10 or ½ seconds after power switch S is closed by setting the time constant to 1/10 or ½ seconds. Thus, output voltage $V_{min}$ at the secondary coil of the output transformer becomes in-phase to the ac source, and, as a result, the superposed voltage increases as indicated in FIG. 5 with the solid line. Thereafter, superposed voltage $V_{min}+V_{AC}$, as indicated in FIG. 5 with the solid line, energizes between terminals X and Y of the circuit as shown in FIG. 1, followed by rectification by diode $D_3$ to charge capacitance $C_5$. Energization of the voltage across capacitance $C_5$ to relay G closes contacts V and W to short bidirectional triode thyristor K.

As described above, the controlled rectifier such as bidirectional triode thyristor, inserted in the main circuit, scarcely generates heat because the controlled rectifier briefly conducts as determined by the time constant circuit. This dispenses the necessity of a forced cooling using radiator or blower to minimize and improve the size and durability of the switching circuit. Furthermore, mechanical contacts V and W never causes arc on switching, and their life becomes semipermanent because they switch an anode-cathode voltage of only about 1 volt.

Figure 2:
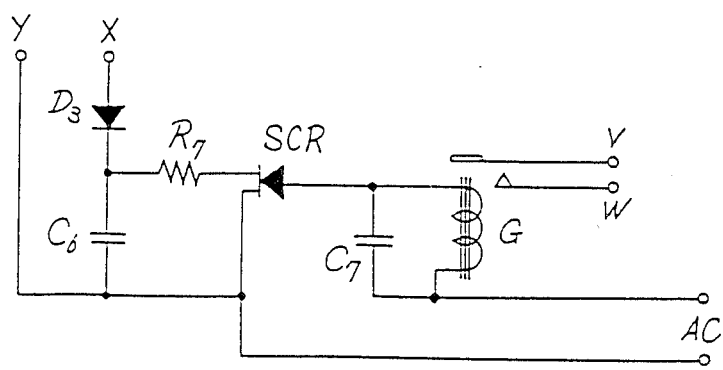
FIG. 2 is a power circuit for driving the mechanical contacts.

If a superposed voltage is not sufficient to drive mechanical contacts such as a relay, the voltage may be amplified to a prescribed level with a transistor or combination with a suitable switching device such as reverse-blocking triode thyristor. For example, the superposed voltage is first applied between terminals X and Y as shown in FIG. 2, rectified with diode $D_3$, and applied to capacitance $C_6$ to charge it. Thereafter, the voltage across the capacitance is applied to the gate of reverse-blocking triode thyristor SCR through resistance $R_7$. Conduction of reverse-blocking triode thyristor SCR flows current from ac source AC to relay G, and closes contacts V and W to short circuit bidirectional triode thyristor K.

Figure 6:
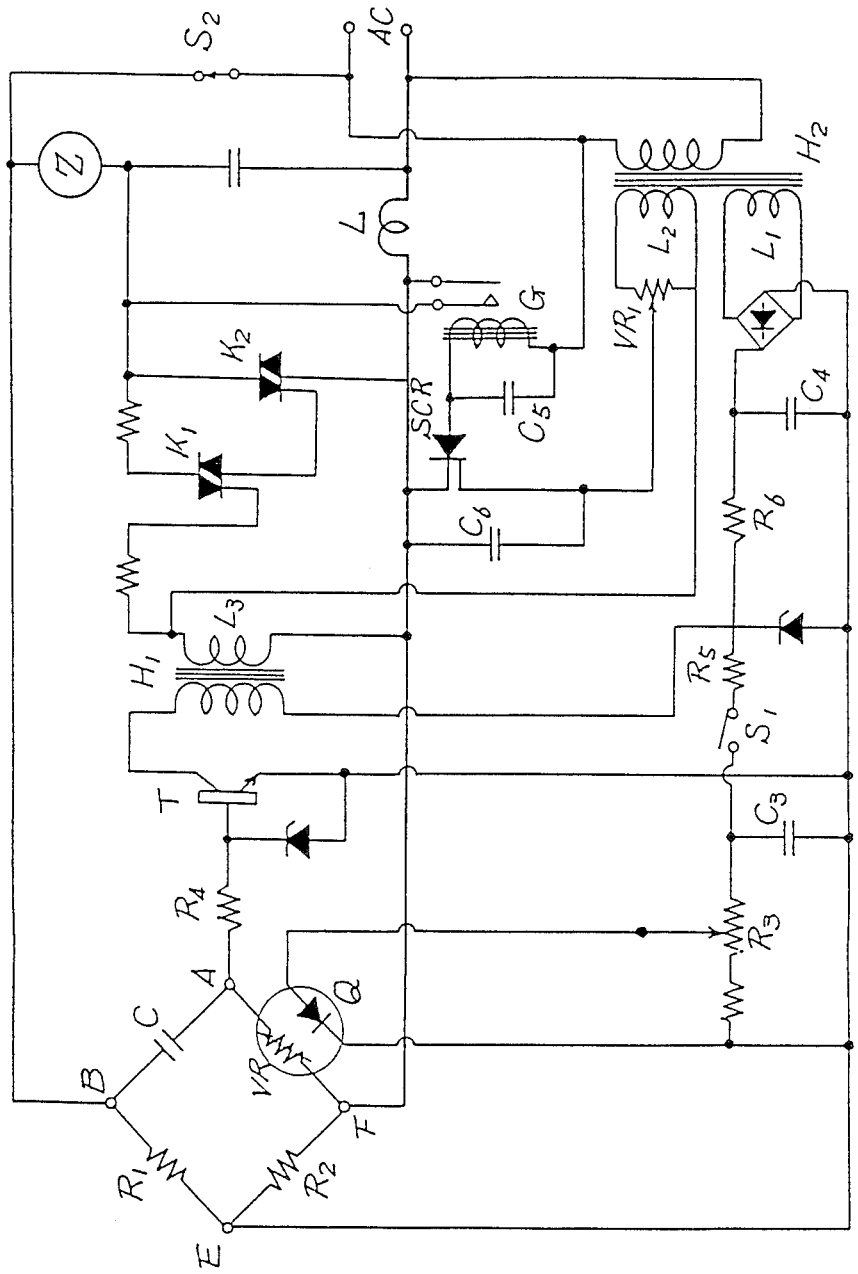
FIGS. 6 and 7 are embodiments according to the invention.

In the embodiment as shown in FIG. 6, in addition to power switch $S_2$ having a relatively high current switching capacity in the main circuit, switch $S_1$ with a relatively low current switching capacity is equipped in the power circuit for time constant circuit. The dangers involved in a high current switching operation can be avoided with this arrangement because the main circuit can be switched with only switch $S_1$ while power switch $S_2$ is closed.

Figure 7:
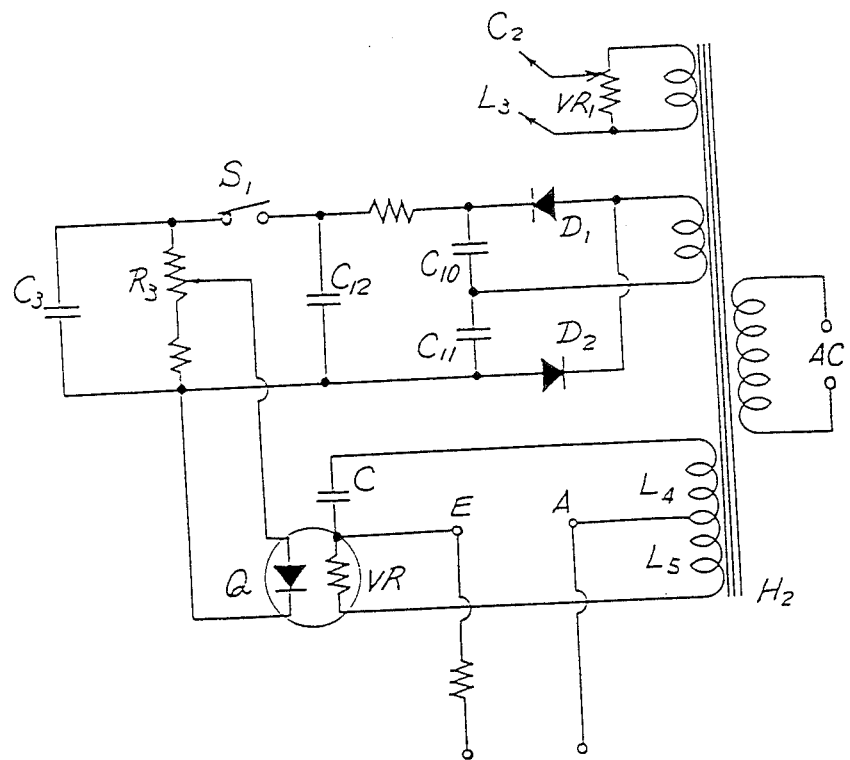

The circuit as shown in FIG. 7 is an embodiment wherein the resistances used at the two arms of ac Wheatstone bridge are replaced with center-tapped secondary coils $L_4$ and $L_5$ of transformer $H_2$ so that electrification of the ac Wheatstone bridge circuit and voltage division of the ac source are both effected with secondary coils of one power transformer. This embodiment has the advantages that it reduces the number of the resistances used in the switching circuit; that it supplies the switching circuit; and still that it improves durability of the switching circuit.

As described above, in the phase-controlled automatic switching circuit according to the invention, the controlled rectifier such as bidirectional triode thyristor, connected with the main circuit, scarcely generates heat because the controlled rectifier briefly conducts from the time the power switch is closed till the operation of the main circuit becomes stationary. In the case of household dimmers using a relatively low current, the present invention dispenses the use of blower and even radiator. Thus, the present invention realizes a miniaturized version of the switching circuit as disclosed in Japan Patent Kokai No. 189,727/84, but is high in durability, and free of motion noise.

In addition, the use of the present switching circuit in a dimmer for incandescent lamp or in a starting- or speed controlling-circuit for electric motor effectively prevents the surge current which may arise in such circuits. Specifically, in the dimmer, the use of the present switching circuit extremely prolongs the life of incandescent lamp filament, as well as minimizing the amount of electricity that would be consumed by controlled rectifier as heat.

While the present invention has been particularly shown and described with reference to preferred embodiments thereof, it will be understood by those skilled in the art that the foregoing and other changes in form and details can be made therein without departing from the spirit and scope of the invention.

I claim:

1. In a phase-controlled switching circuit which comprises a controlled rectifier having a main current path connected with an ac source through a load, and means for triggering the gate of the controlled rectifier while keeping an initial conduction angle thereof small, the improvement whereby the heat generation of the controlled rectifier is reduced, comprising
   a pair of mechanical contacts connected in parallel with the main current path of the controlled rectifier, and means for closing the mechanical contacts when the operation of the load reaches a stationary level, to thereby short circuit said controlled rectifier,
   wherein
   a control signal is provided to said controlled rectifier with a phase relative to a phase of the voltage of said ac source to provide said small initial conduction angle and to increase said conduction angle thereof as said operation of the load reaches said stationary level, and
   a signal corresponding to said control signal is superposed with a voltage of said ac source to provide an activation signal for supplying power from said ac source to said closing means for closing said mechanical contacts when said operation of the load reaches said stationary level,
   said circuit further comprising
   a further switch with a lower current switching capacity, and
   a time constant circuit that charges upon the closing of said further switch,
   wherein said phase angle is controlled by the charging of said time constant circuit, and said phase angle controls the superposing to produce said activation signal for closing said mechanical contacts according to said phase angle.

2. The circuit of claim 1, wherein said load is a lamp.

3. The circuit of claim 1, wherein said controlled rectifier is a bidirectional triode thyristor.

4. The circuit of claim 1, wherein a relay is used to provide the mechanical contacts.

5. The circuit of claim 1, said closing means comprising a relay for closing said mechanical contacts, wherein the activation signal is amplified and supplied to said relay.

6. The circuit of claim 1, containing a single power transformer, said single power transformer having a plurality of secondary coils for supplying power for providing said control signal with the varying phase angle and for closing said relay.

7. The circuit of claim 1, wherein said load is an electric motor.

* * * * *